US008762030B2

(12) United States Patent
Saruwatari

(10) Patent No.: US 8,762,030 B2
(45) Date of Patent: Jun. 24, 2014

(54) FUEL SUPPLY CONTROL DEVICE FOR INTERNAL COMBUSTION ENGINE AND FUEL VAPOR PROCESSING METHOD

(75) Inventor: Masayuki Saruwatari, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 742 days.

(21) Appl. No.: 13/050,460

(22) Filed: Mar. 17, 2011

(65) Prior Publication Data

US 2011/0231082 A1 Sep. 22, 2011

(30) Foreign Application Priority Data

Mar. 19, 2010 (JP) ................................ 2010-064856

(51) Int. Cl.

| | |
|---|---|
| ***F02D 41/04*** | (2006.01) |
| *F02M 37/08* | (2006.01) |
| *F02P 5/15* | (2006.01) |
| *G01M 15/00* | (2006.01) |

(52) U.S. Cl.
USPC ......................... 701/104; 123/520; 73/114.43

(58) Field of Classification Search
USPC .................. 701/104, 105; 123/516, 518, 520; 73/35.12, 114.41, 114.43
See application file for complete search history.

(56) References Cited

U.S. PATENT DOCUMENTS

| | | | | |
|---|---|---|---|---|
| 5,448,980 | A * | 9/1995 | Kawamura et al. | 123/520 |
| 5,497,754 | A * | 3/1996 | Ito | 123/520 |
| 5,842,454 | A | 12/1998 | Miwa et al. | |
| 7,213,584 | B2 * | 5/2007 | Ohhashi et al. | 123/520 |
| 2010/0332108 | A1 * | 12/2010 | Kato et al. | 701/104 |

FOREIGN PATENT DOCUMENTS

| | | | |
|---|---|---|---|
| JP | 63-306274 | A | 12/1988 |
| JP | 6-146984 | A | 5/1994 |
| JP | 6-317228 | A | 11/1994 |
| JP | 9-151823 | A | 6/1997 |
| JP | 2005-76568 | A | 3/2005 |
| JP | 2006-200423 | A | 8/2006 |
| JP | 2006-250113 | A | 9/2006 |
| JP | 2007-77898 | A | 3/2007 |

OTHER PUBLICATIONS

Japanese Office Action dated Jun. 26, 2012 with English translation (Seven (7) pages).
Japanese Office Action with English translation dated Oct. 2, 2012 (three (3) pages).

* cited by examiner

*Primary Examiner* — Hieu T Vo
(74) *Attorney, Agent, or Firm* — Crowell & Moring LLP

(57) ABSTRACT

The present invention relates to a fuel supply control device for an internal combustion engine and a fuel vapor processing method. In the fuel supply control device that calculates a manipulated variable of a fuel pump such that a fuel pressure detected by a fuel pressure sensor is brought close to a target fuel pressure, a determination whether a fuel vapor is generated is made based on a detection value of the fuel pressure and the manipulated variable in a fuel pump, or the determination is made based on an amplitude of the detection value of the fuel pressure and an average fuel pressure in a fuel supply piping. During the fuel vapor generation, the target fuel pressure is corrected to be a higher value to increase the fuel pressure, thereby compressing and removing the fuel vapor. Therefore, in a fuel supply system, the fuel vapor generation can be detected at low cost to suppress the fuel vapor generation.

17 Claims, 5 Drawing Sheets

FUEL SUPPLY CONTROL DEVICE FOR INTERNAL COMBUSTION ENGINE AND FUEL VAPOR PROCESSING METHOD

BACKGROUND OF THE INVENTION

1. Field of the Invention

The present invention relates to a fuel supply control device for an internal combustion engine, which calculates a manipulated variable of a fuel pump based on a detection value of a fuel pressure and output the calculated manipulated variable, and a fuel vapor processing method in the fuel supply control device.

2. Description of Related Art

In a technique disclosed in Japanese Laid-Open (Kokai) Patent Application Publication No. 9-151823, a current value driving a fuel pump is maximized until a rotating speed of the fuel pump reaches a first predetermined rotating speed during engine starting, and feedback control of the current value is performed such that a fuel pressure is matched with a target fuel pressure after the rotating speed of the fuel pump reaches the first predetermined rotating speed. Japanese Laid-Open (Kokai) Patent Application Publication No. 9-151823 also discloses the following fact. That is, when the rotating speed of the fuel pump exceeds a second rotating speed during the feedback control of the current value, a large quantity of air or fuel vapor is determined to be mixed in fuel piping, and the current value is maximized.

As described above, a sensor that detects the rotating speed of the fuel pump is required in the device that determines the presence or absence of the fuel vapor generation based on the rotating speed of the fuel pump, which results in a problem in that cost of the device increases.

SUMMARY OF THE INVENTION

An object of the invention is to be able to detect the generation of the fuel vapor with an inexpensive device.

In order to achieve the object, a fuel supply control device for internal combustion engine according to an aspect of the invention inputs an output signal of a fuel pressure sensor that detects a pressure of fuel discharged by a fuel pump and calculates a manipulated variable of the fuel pump such that the fuel pressure comes close to a target value and outputs the calculated manipulated variable, and a determination whether a fuel vapor is generated is made by comparing a threshold and a state quantity of the fuel pressure calculated based on the output signal of the fuel pressure sensor.

A vapor processing method according to another aspect of the invention is a fuel vapor processing method in a fuel supply control device for internal combustion engine that inputs an output signal of a fuel pressure sensor detecting a pressure of fuel discharged by a fuel pump and calculates a manipulated variable of the fuel pump such that the fuel pressure comes close to a target value and output the calculated manipulated variable, in the fuel vapor processing method, a state quantity of the fuel pressure is computed based on the output signal of the fuel pressure sensor that detects the pressure of the fuel discharged by the fuel pump, and a determination whether a fuel vapor is generated is made by comparing a threshold and the state quantity.

The other objects and features of this invention will become understood from the following description with reference to the accompanying drawing.

DESCRIPTION OF THE PREFERRED EMBODIMENTS

Figure 1:
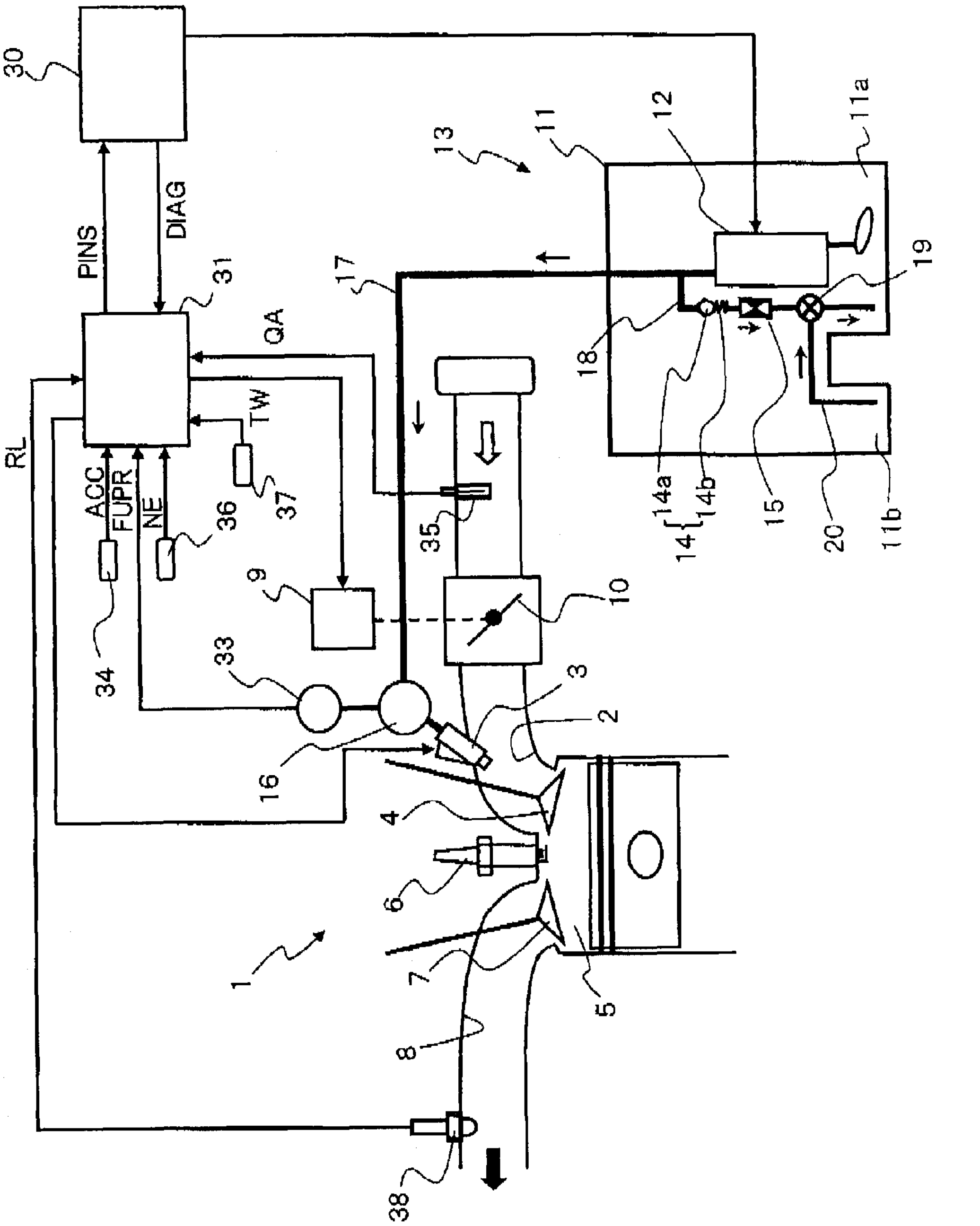
FIG. 1 is a system view illustrating a vehicle internal combustion engine according to an embodiment of the invention.

FIG. 1 illustrates a system configuration of a vehicle internal combustion engine including a fuel supply control device for an internal combustion engine according to an embodiment of the invention.

In FIG. 1, an internal combustion engine 1 includes a fuel injection valve 3 in an intake passage 2, and fuel injection is performed to internal combustion engine 1 by opening fuel injection valve 3.

The fuel injected by fuel injection valve 3 and air are sucked into a combustion chamber 5 through an intake valve 4, and the fuel is ignited and combusted by spark ignition using an ignition plug 6. A combustion gas in combustion chamber 5 is discharged to an exhaust passage 8 through an exhaust valve 7.

An electronic control throttle 10 that is opened and closed by a throttle motor 9 is provided on an upstream side of fuel injection valve 3 in intake passage 2, and an intake air quantity of internal combustion engine 1 is adjusted by an opening of electronic control throttle 10.

A fuel supply device 13 is also provided in order to pump the fuel in a fuel tank 11 to fuel injection valve 3 using a fuel pump 12.

Fuel supply device 13 includes fuel tank 11, fuel pump 12, a pressure regulating valve 14, an orifice 15, a fuel gallery piping 16, a fuel supply piping 17, a fuel-return piping 18, a jet pump 19, and a fuel transfer pipe 20.

Fuel pump 12 is an electric pump in which an electric motor rotates a pump impeller, and fuel pump 12 is disposed in fuel tank 11.

One end of fuel supply piping 17 is connected to a discharge port of fuel pump 12, the other end of fuel supply piping 17 is connected to fuel gallery piping 16, and a fuel supply port of fuel injection valve 3 is connected to fuel gallery piping 16.

Fuel-return piping 18 is branched from fuel supply piping 17 in fuel tank 11, and the other end of fuel-return piping 18 is opened into fuel tank 11.

Pressure regulating valve 14, orifice 15, and jet pump 19 are interposed in the order from the upstream side the fuel-return piping 18.

Pressure regulating valve 14 includes a valve body **14*a* that opens and closes fuel-return piping 18 and an elastic member 14*b* such as a coil spring that presses valve body 14*a* toward a valve seat provided on the upstream side of fuel-return piping 18. Pressure regulating valve 14 is opened when the fuel pressure supplied to fuel injection valve 3 exceeds a minimum pressure FPMIN, and pressure regulating valve 14** is closed when the fuel pressure becomes the minimum pressure FPMIN or less.

As described above, pressure regulating valve 14 is opened when the fuel pressure supplied to fuel injection valve 3 exceeds the minimum pressure FPMIN. However, because a fuel flow rate returned to fuel tank 11 through fuel-return piping 18 is reduced by orifice 15 provided on the downstream side of pressure regulating valve 14, the fuel pressure can be increased to a level exceeding the minimum pressure FPMIN by increasing the fuel discharge quantity from fuel pump 12 to the return flow rate or more.

Pressure regulating valve 14 may have a function of narrowing the flow rate without providing orifice 15.

Jet pump 19 transfer the fuel through fuel transfer pipe 20 by a flow of the fuel returned to fuel tank 11 through pressure regulating valve 14 and orifice 15.

In fuel tank 11, a bottom surface partially rises, a bottom space is partitioned into two regions 11*a* and 11*b*, and the suction port of fuel pump 12 is opened to region 11*a*. Therefore, unless the fuel in region 11*b* is transferred onto the side of region 11*a*, the fuel remains in the region 11*b*.

Therefore, jet pump 19 applies a negative pressure into fuel transfer pipe 20 by the flow of the fuel returned into region 11*a* of fuel tank 11 through pressure regulating valve 14 and orifice 15, and the fuel in region 11*b* to which fuel transfer pipe 20 is opened is guided to jet pump 19 through fuel transfer pipe 20 and discharged in region 11*a*.

An ECM (Engine Control Module) 31 including a microcomputer is provided as an engine control unit that controls the fuel injection of fuel injection valve 3, the ignition of ignition plug 6, and the opening of electronic control throttle 10.

An FPCM (Fuel Pump Control Module) 30 including a microcomputer is provided as a fuel pump control unit that outputs a manipulated variable of fuel pump 12 to drive fuel pump 12.

Each of ECM 31 and FPCM 30 includes a communication circuit that transmits and receives information therebetween, and ECM 31 transmits an instruction signal PINS of drive duty of fuel pump 12 to FPCM 30.

In the embodiment, the drive duty (%) indicates a ratio of an on-time, and it is assumed that an applied voltage of fuel pump 12 is increased with increasing drive duty (%).

FPCM 30 diagnoses an input abnormality of the instruction signal PINS and the like and transmits a diagnostic signal DIAG indicating a diagnosis to ECM 31.

A control unit in which ECM 31 that is of the fuel supply control device and FPCM 30 that receives the instruction from ECM 31 to drive fuel pump 12 are integrated may be provided.

A fuel supply device that does not include pressure regulating valve 14, orifice 15, fuel-return piping 18, and jet pump 19 may be provided.

The detection signals are input to ECM 31 from a fuel pressure sensor 33, an accelerator opening sensor 34, an air flow sensor 35, a rotation sensor 36, a water temperature sensor 37, and an oxygen sensor 38. Fuel pressure sensor 33 generates an output signal indicating a fuel pressure FUPR in fuel gallery piping 16. Accelerator opening sensor 34 detects an accelerator opening ACC. Air flow sensor 35 detects an intake air flow rate QA of internal combustion engine 1. Rotation sensor 36 detects a rotating speed NE (rpm) of internal combustion engine 1. Water temperature sensor 37 detects a cooling water temperature TW of internal combustion engine 1. Oxygen sensor 38 detects rich and lean RL of an air-fuel ratio of internal combustion engine 1 to a theoretical air-fuel ratio according to an oxygen concentration in an exhaust gas.

The fuel pressure FUPR is a discharge pressure of fuel pump 12 and also a pressure of the fuel supplied to fuel injection valve 3.

An air-fuel ratio sensor that can widely detect the air-fuel ratio may be provided instead of oxygen sensor 38.

ECM 31 calculates a basic injection pulse width TP based on the intake air flow rate QA and the engine rotating speed NE, and corrects the basic injection pulse width TP according to the fuel pressure FUPR at that time. ECM 31 calculates an air-fuel ratio feedback correction coefficient LAMBDA in order to bring the actual air-fuel ratio close to the target air-fuel ratio based on the output of oxygen sensor 38, corrects the basic injection pulse width TP corrected according to the fuel pressure FUPR using the air-fuel ratio feedback correction coefficient LAMBDA, and finally calculates an injection pulse width TI.

In fuel injection timing of each cylinder, ECM 31 outputs an injection pulse signal having the injection pulse width TI to fuel injection valve 3 to control the fuel injection quantity and injection timing of fuel injection valve 3.

ECM 31 calculates an ignition timing based on engine operating conditions such as the basic injection pulse width TP and the engine rotating speed NE, and ECM 31 controls a current passed through an ignition coil (not illustrated) so that an ignition is discharged in the ignition timing by ignition plug 6.

ECM 31 calculates the target opening of electronic control throttle 10 based on the accelerator opening ACC and the like, and ECM 31 controls throttle motor 9 so that the actual opening of electronic control throttle 10 is brought close to the target opening.

Additionally, ECM 31 calculates a target fuel pressure TGPR based on the engine operating conditions such as the basic injection pulse width TP, the engine rotating speed NE, and the cooling water temperature TW while detecting the actual fuel pressure FUPR based on the detection signal of fuel pressure sensor 33.

ECM 31 uses the cooling water temperature TW as a temperature representing the engine temperature. Alternatively, ECM 31 can calculate the target fuel pressure TGPR using a temperature of a lubricant oil of internal combustion engine 1 as the temperature representing the engine temperature instead of the cooling water temperature TW.

ECM 31 calculates the ignition timing and the target fuel pressure TGPR using the basic injection pulse width TP as a variable indicating an engine load. Alternatively, for example, the opening of electronic control throttle 10, the intake air quantity, and the intake negative pressure can be used as the variable indicating the engine load instead of the basic injection pulse width TP.

For example, in a high load and high rotation region, ECM 31 sets the target fuel pressure TGPR to the fuel pressure higher than that in a low load and low rotation region. When the engine is in cold condition in which the cooling water temperature TW is low, the fuel pressure is set higher than that after warming up of the engine.

For example, ECM 31 calculates drive duty DUTY of fuel pump 12 by Proportional-Integral-Derivative (PID) control based on a deviation between the fuel pressure FUPR and the target fuel pressure TGPR so that the fuel pressure FUPR detected based on the output signal of fuel pressure sensor 33 comes close to the target fuel pressure TGPR.

In the feedback control that is performed to bring the fuel pressure FUPR close to the target fuel pressure TGPR, the drive duty DUTY can be calculated so that the drive duty DUTY follows a reference target corresponding to a desired fuel pressure response property using model reference adaptive control.

In the model reference adaptive control, the target fuel pressure TGPR is converted into a reference response target value corresponding to a reference response based on a reference model of the fuel pressure control system, a feedback quantity is calculated based on a deviation between the reference response target value and the fuel pressure FUPR detected based on the output signal of fuel pressure sensor 33, a feedforward quantity is calculated based on the target fuel pressure, and a value in which the feedback quantity and the feedforward quantity are added is output as the final manipulated variable.

ECM 31 transmits the instruction signal PINS indicating the drive duty DUTY to FPCM 30. FPCM 30 that receives the instruction signal PINS adjusts a voltage applied to fuel pump 12 by a switching operation corresponding to the drive duty DUTY and applies the adjusted voltage to fuel pump 12.

ECM 31 has a function of determining whether a fuel vapor is generated in the fuel supply system and of correcting the target fuel pressure TGPR to a higher value when the fuel vapor is generated. A vapor processing function will be described in detail below.

Figure 2:
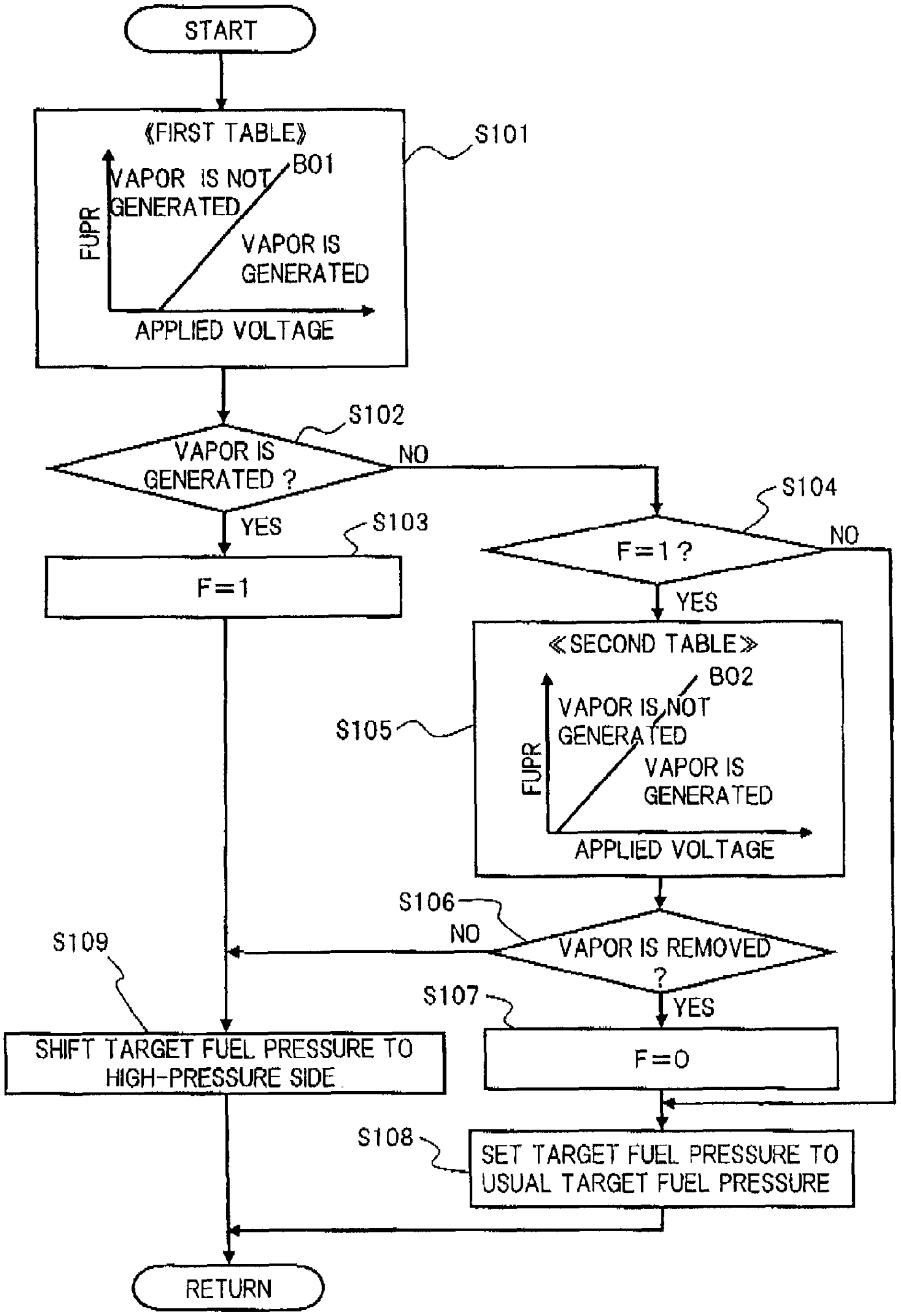
FIG. 2 is a flowchart illustrating a fuel vapor processing according to a first embodiment of the invention.

A flowchart of FIG. 2 illustrates a first embodiment in which a determination whether the fuel vapor is generated in fuel pump 12 is made based on the fuel pressure FUPR that is of the state quantity of the fuel pressure and the applied voltage that is of the manipulated variable of fuel pump 12. ECM 31 executes a routine illustrated in the flowchart of FIG. 2 at a constant period.

In Step S101, a determination whether a current combination of the applied voltage and the fuel pressure FUPR falls within a region in which the fuel vapor is generated or a region in which the fuel vapor is not generated, is made by referring to a first table which previously stores whether correlation between the applied voltage of fuel pump 12 and the fuel pressure FUPR corresponds to the state in which the fuel vapor is generated or the state in which the fuel vapor is not generated.

In the first table, a boundary value BO1 that separates the region in which the fuel vapor is not generated from the region in which the fuel vapor is generated is shifted to the higher fuel pressure as the applied voltage increases, that is, as the manipulated variable changes to the side on which a discharge quantity of fuel pump 12 increases. The region in which the fuel pressure FUPR is higher than boundary value BO1 corresponds to the region in which the fuel vapor is not generated, and the region in which the fuel pressure FUPR is lower than boundary value BO1 corresponds to the region in which the fuel vapor is generated.

In other words, the first table is set such that the generation of the fuel vapor is estimated, when the fuel pressure FUPR is lower than a first threshold that is set to a higher value with increasing applied voltage of fuel pump 12.

When the fuel vapor is generated in fuel pump 12, the higher applied voltage is necessary to maintain the same fuel pressure. Therefore, the generation of the fuel vapor is estimated in fuel pump 12 when the applied voltage is required higher than the applied voltage necessary for the state in which the fuel vapor is not generated.

The applied voltage of fuel pump 12 is set so as to become higher than the boundary value BO1 when a fuel vapor generation quantity is greater than an allowance, and it can be estimated that the fuel vapor generation quantity is greater than the allowance when the voltage higher than the boundary value BO1 is required. On the other hand, it can be estimated that the fuel vapor generation quantity falls within the allowance when the applied voltage of fuel pump 12 is lower than the boundary value BO1.

In the first table of FIG. 2, the boundary value BO1 that separates the region in which the fuel vapor is not generated from the region in which the fuel vapor is generated is set to the property in which the fuel pressure linearly increases with increasing applied voltage. The boundary value BO1 is not limited to the linear property.

In the first table of FIG. 2, the first threshold of the fuel pressure is set to a higher level as the applied voltage increases at that time. The determination that the fuel vapor is not generated is made when the fuel pressure FUPR is higher than the first threshold, and the determination that the fuel vapor is generated is made when the fuel pressure FUPR is lower than the first threshold. There is no limitation to the determination that is made using the first table of FIG. 2.

In Step S102, it is determined whether the determination that the fuel vapor is generated is made based on the applied voltage and the fuel pressure FUPR at that time in Step S101, that is, it is determined whether the fuel pressure FUPR at that time is lower than the first threshold corresponding to the applied voltage.

When the determination that the fuel vapor is not generated is made because the fuel pressure FUPR is higher than the first threshold corresponding to the applied voltage, the process proceeds to Step S104 to make a determination whether a flag F is set to 1.

The flag F, described later, is set to "1" when the determination that the fuel vapor is generated is made in Step S101. Then, the flag F is maintained at "1" until a determination that the fuel vapor can be removed is made, and the flag F is reset to "0" at the time the determination that the fuel vapor can be removed is made.

Accordingly, when the continuous fuel vapor is not generated, the flag F is set to "0", and the process proceeds to Step S108.

In Step S108, a target fuel pressure TGPR-STD that is set according to the engine operating conditions such as the engine load TP, the engine rotating speed NE, and the cooling water temperature TW is set to the final target fuel pressure TGPR, and the applied voltage of fuel pump 12 is controlled such that the actual fuel pressure FUPR is brought close to the target fuel pressure TGPR.

On the other hand, in Step S101, when the determination that the current combination of the applied voltage and the fuel pressure FUPR at the time corresponds to the region in which the fuel vapor is generated is made, that is, when the fuel pressure FUPR is lower than the first threshold corresponding to the applied voltage at that time, the process proceeds from Step S102 to Step S103.

In Step S103, the flag F is set to "1". Then the process proceeds to Step S109.

In Step S109, the target fuel pressure TGPR is corrected to be higher than the target fuel pressure TGPR-STD in order to compress and remove the fuel vapor generated in fuel pump 12.

In the correction of the target fuel pressure TGPR, the result in which a correction value TGPRHOS ($0<\text{TGPRHOS}$) is added to the target fuel pressure TGPR-STD is set to the final target fuel pressure TGPR.

The correction value TGPRHOS is previously adopted as a value in which the target fuel pressure TGPR can be increased to a level at which the fuel vapor can be compressed and removed. At this point, the correction value TGPRHOS may be a fixed value, or the correction value TGPRHOS may be set a value that can change according to at least one of the operation conditions, such as the fuel temperature, the engine temperature, the fuel property, and the pressure in fuel tank 11, which affect the fuel vapor generation quantity.

Because the liquid fuel is an incompressible fluid, the fuel vapor that is of the compressible fluid included in the fuel is compressed when the fuel pressure increased. The target air-fuel ratio can be controlled by correcting the basic injection pulse width TP according to the fuel pressure FUPR at that time.

When the correction value TGPRHOS is set to the value that can change according to the operating conditions such as the fuel temperature, because the fuel vapor is easily generated when the fuel temperature or the engine temperature rises, for example, the correction value TGPRHOS is increased to change the target fuel pressure TGPR to the higher value as the fuel temperature or the engine temperature rises.

When the fuel has a fuel property of a high vapor pressure, because the fuel vapor is easily generated when the fuel becomes high temperature, the correction value TGPRHOS is increased to change the target fuel pressure TGPR to the higher value as the vapor pressure of the fuel increases.

When the pressure in fuel tank 11 is low, because the fuel vapor is easily generated, the correction value TGPRHOS is increased to change the target fuel pressure TGPR to the higher value as the pressure in fuel tank 11 decreases.

The correction value TGPRHOS can be set by the combination of the plural operating conditions such as the fuel temperature, the engine temperature, the fuel property, and the pressure in fuel tank 11.

The target fuel pressure TGPR can be changed to the target fuel pressure for compressing the fuel vapor without correcting the correction value TGPRHOS. The target fuel pressure for compressing the fuel vapor can be set to a fixed value or a value that can change according to the operating conditions such as the fuel temperature.

The correction value TGPRHOS can gradually be increased from a fixed initial value or an initial value that can change according to the operating conditions such as the fuel temperature.

As described above, the determination whether the fuel vapor is generated is made based on the applied voltage that is of the manipulated variable of the fuel pump 12 and the fuel pressure FUPR. For the fuel vapor generation state, the fuel vapor can be compressed and removed in the fuel pump 12 when the target fuel pressure TGPR is changed to a higher value, and when the fuel vapor quantity reduces, the applied voltage necessary to set the fuel pressure FUPR to a pressure in the vicinity of the target fuel pressure TGPR decreases.

Accordingly, the applied voltage necessary to obtain the fuel pressure FUPR in the vicinity of the target fuel pressure TGPR that is changed to the higher value decreases when the target fuel pressure TGPR is set to a higher value in Step S109 to compress the fuel vapor, and the combination of the applied voltage and the fuel pressure FUPR is gradually shifted from the region in which the fuel vapor is generated toward the region in which the fuel vapor is not generated according to the decrease in fuel vapor quantity in the first table referred to in Step S101. Finally, the combination of the applied voltage and the fuel pressure FUPR corresponds to the region in which the fuel vapor is not generated.

In Step S102, when the determination that the combination of the applied voltage and the fuel pressure FUPR corresponds to the region in which the fuel vapor is not generated is made, the process proceeds to Step S104, and the process proceeds from Step S104 to Step S105 because the flag F is set to "1".

In Step S105, a determination whether the combination of the applied voltage and the fuel pressure FUPR corresponds to the region in which the fuel vapor is generated is made by referring to a second table in which the region in which the fuel vapor is generated is widened while the region in which the fuel vapor is not generated is narrowed compared with the first table used in Step S101.

In other words, the second table is one in which a boundary value BO2 that separates the region in which the fuel vapor is not generated from the region in which the fuel vapor is generated is shifted to the low-voltage side from the boundary value BO1 of the first table.

A determination whether the fuel vapor quantity becomes sufficiently lower is made based on the second table.

When the determination whether the fuel vapor quantity is sufficiently lower is made based on the first table referred to in Step S101, the determination that the fuel vapor is generated and the determination that the fuel vapor is not generated are alternately made due to the change in fuel pressure or applied voltage near the boundary value BO1.

Therefore, the second table in which the region in which the fuel vapor is generated is widened while the region in which the fuel vapor is not generated is narrowed compared with the first table is referred to in Step S105 such that the determination that the fuel vapor generation state is eliminated is made when the combination of the applied voltage and the fuel pressure FUPR is shifted to the side of the region in which the fuel vapor is not generated by a predetermined width or more during the correction of the target fuel pressure TGPR.

That is, the fuel pressure threshold used to determine whether the fuel pressure enters the fuel vapor generation region differs from the fuel pressure threshold used to determine whether the fuel pressure escapes from the fuel pressure generation region such that a hysteresis is provided in determining whether the fuel pressure is generated.

In Step S106, it is determined whether the determination that the combination of the applied voltage and the fuel pressure FUPR corresponds to the fuel vapor generation region is made in Step S105. When the combination of the applied voltage and the fuel pressure FUPR corresponds to the fuel vapor generation region, a determination that the correction of the target fuel pressure TGPR cannot be released is made although the applied voltage decreases by the removal of the fuel vapor, the process proceeds to Step S109, and the correction of the target fuel pressure TGPR is continued.

On the other hand, when the determination that the combination of the applied voltage and the fuel pressure FUPR corresponds to the region in which the fuel vapor is not generated is made in Step S105, a determination that the removal of the fuel vapor sufficiently progresses to be able to release the correction of the target fuel pressure TGPR is made. After the flag F is reset to "0" in Step S107, the process proceeds to Step S108, the correction of the target fuel pressure TGPR is released, and the target fuel pressure TGPR-STD corresponding to the operating conditions is directly set to the final target fuel pressure TGPR.

According to the embodiment, because the determination whether the fuel vapor is generated is made based on the output signal of fuel pressure sensor 33, it is not necessary to provide a new sensor to determine whether the fuel vapor is generated, and the system cost can be suppressed.

When the fuel vapor generation is detected, the target fuel pressure TGPR is changed to the higher value to compress the fuel vapor, so that the fuel vapor generated in fuel pump 12 can quickly be removed.

In the embodiment, the first table used to determine whether the fuel vapor is generated and the second table used to determine whether the removal of the fuel vapor is completed are provided, and the correction of the target fuel pressure TGPR is released after the fuel vapor is sufficiently removed by the correction of the target fuel pressure TGPR. Therefore, the repetition of the correction of the target fuel pressure TGPR and the release of the correction of the target fuel pressure TGPR can be suppressed. Accordingly, the state in which the fuel vapor is not generated is stably obtained, so that the deviation of the correlation between the fuel injection pulse width and the fuel injection quantity can be suppressed to maintain measurement accuracy of fuel injection valve 3.

In the correction of the target fuel pressure TGPR, when the correction level can change according to the conditions, such as the fuel temperature, which affect the fuel vapor generation, the useless power consumption caused by correcting the target fuel pressure TGPR to an excessively high value during the fuel vapor generation can be suppressed.

Figure 3:
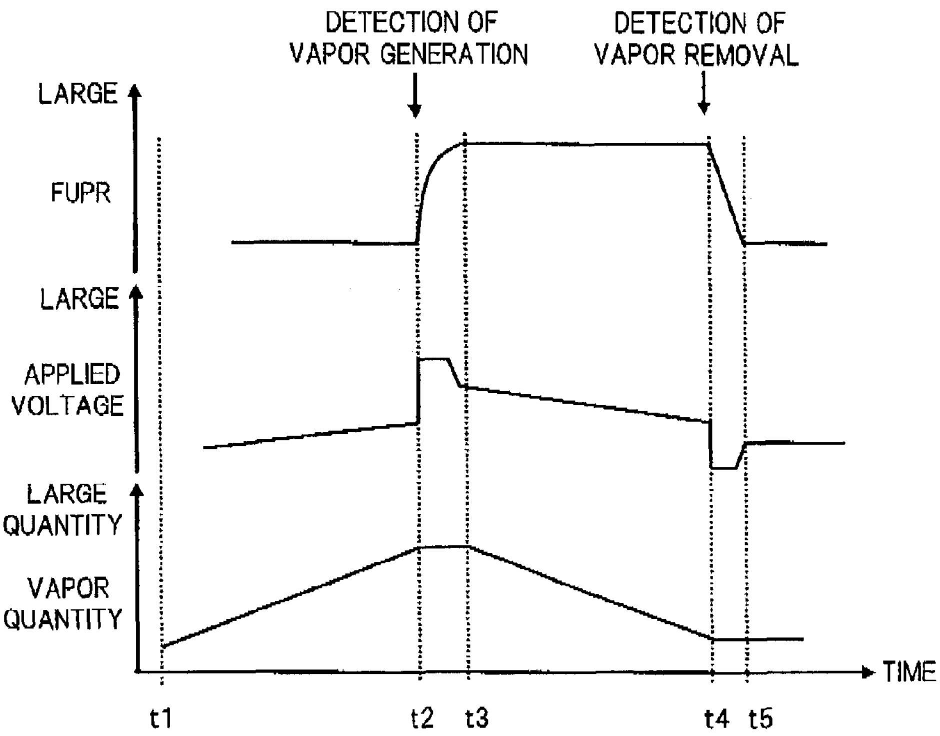
FIG. 3 is a timing chart illustrating a correlation among a fuel pressure, pump drive duty, and a fuel vapor generation quantity when the fuel pressure is controlled by model reference adaptive control in the embodiment of the invention.
Figure 4:
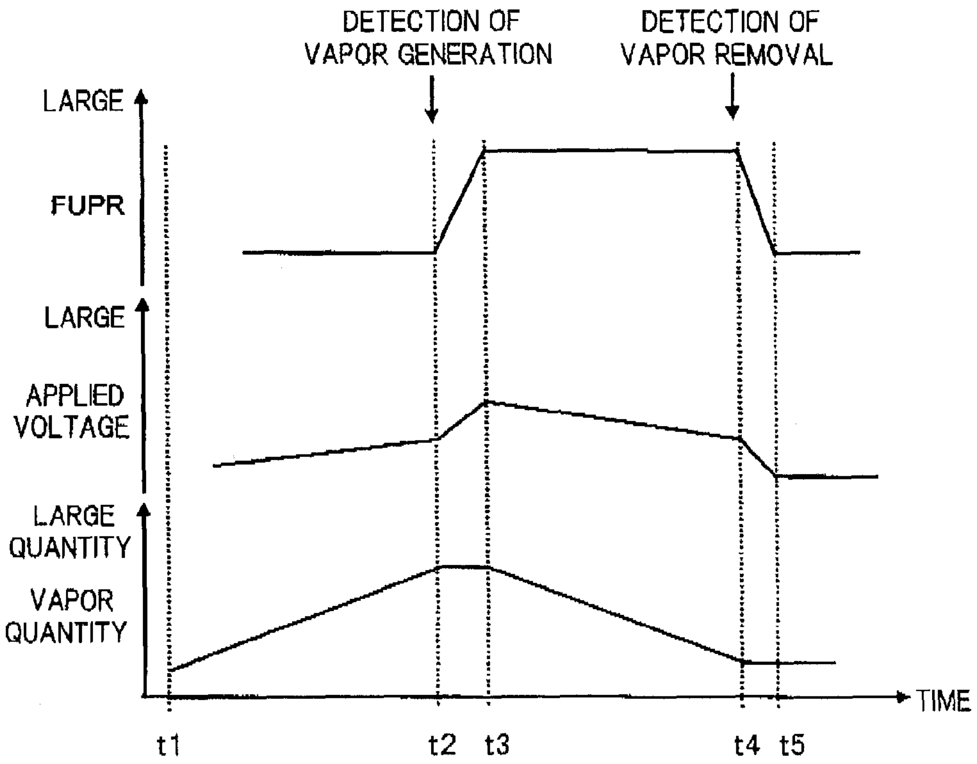
FIG. 4 is a timing chart illustrating a correlation among the fuel pressure, the pump drive duty, and the fuel vapor generation quantity when the fuel pressure is controlled by PID control in the embodiment of the invention.

FIG. 3 and FIG. 4 are timing charts illustrating the fuel vapor detection and the fuel pressure control state of the embodiment, FIG. 3 illustrates the case in which the model reference adaptive control is used in the feedback control that brings the fuel pressure FUPR close to the target fuel pressure TGPR, and FIG. 4 illustrates the case in which the PD control is used.

In the timing charts of FIG. 3 and FIG. 4, between a time t1 and a time t2, the fuel vapor quantity continuously increases in fuel pump 12, and the applied voltage of fuel pump 12 gradually increases to compensate the quantity of the decrease in fuel pressure due to the fuel vapor generation.

At the time t2, the fuel vapor generation is detected when the applied voltage corresponding to the fuel pressure exceeds the threshold.

When the fuel vapor generation is detected at the time t2, the target fuel pressure TGPR is changed to the higher value, and the actual fuel pressure FUPR is brought close to the post-change target fuel pressure TGPR. Therefore, the applied voltage of fuel pump 12 increases as a result of the feedback control.

At a time t3, when actual fuel pressure FUPR increases to a pressure in the vicinity of the target fuel pressure TGPR changed higher than usual, the fuel vapor is compressed by the higher fuel pressure FUPR, and the fuel vapor quantity starts to decrease.

The applied voltage necessary to maintain the actual fuel pressure FUPR to a pressure in the vicinity of the target fuel pressure TGPR changed higher than usual decrease by the decrease in fuel vapor quantity. The determination that the removal of the fuel vapor is completed is made when the applied voltage corresponding to the fuel pressure is lower than the threshold at a time t4.

When the determination that the removal of the fuel vapor is completed is made at the time t4, the target fuel pressure TGPR is decreased to a usual value, and the fuel pressure FUPR is decreased to the decreased target fuel pressure TGPR. Therefore, the applied voltage decreases, and the applied voltage is stabilized at a time t5 at which the fuel pressure FUPR decreases to a pressure in the vicinity of the target fuel pressure TGPR.

In the embodiment, the determination whether the fuel vapor is generated is made based on the applied voltage that is of the manipulated variable of fuel pump 12 and the fuel pressure FUPR. Alternatively, the fuel vapor generation in fuel supply piping 17 may be estimated from an amplitude ΔFUPR of the fuel pressure FUPR to correct the target fuel pressure TGPR in order to compress the fuel vapor in fuel supply piping 17.

That is, the pressure in fuel supply piping 17 generates pulsation synchronized with the injection of fuel injection valve 3. When the fuel vapor that is of the compressible fluid is generated in fuel supply piping 17, the fuel vapor repeatedly compresses and expands by the pressure pulsation generated by the injection of fuel injection valve 3, thereby increasing the amplitude of the pressure pulsation.

Accordingly, the fuel vapor generation can be estimated in the fuel supply piping 17 when the amplitude ΔFUPR of the pressure pulsation increases.

Figure 5:
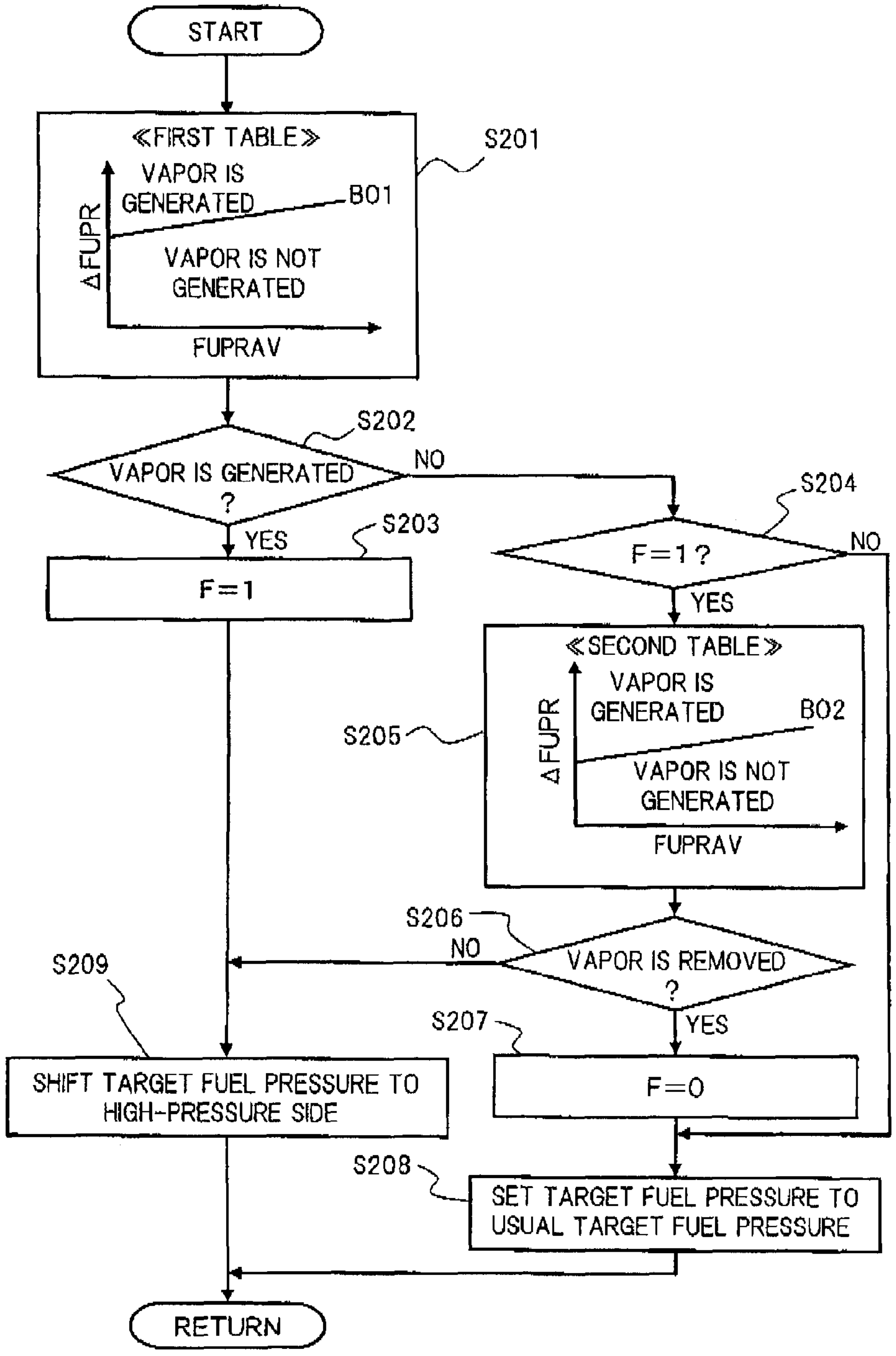
FIG. 5 is a flowchart illustrating a fuel vapor processing according to a second embodiment of the invention.

FIG. 5 is a flowchart illustrating a second embodiment in which a detection whether the fuel vapor is generated in fuel supply piping 17 is made based on the amplitude ΔFUPR of the fuel pressure.

In a routine of the flowchart of FIG. 5, ECM 31 execute interrupt at a constant time period, and in Step S201, an average value FUPRAV of the fuel pressure FUPR detected by fuel pressure sensor 33 is calculated while the amplitude ΔFUPR of the fuel pressure FUPR detected by fuel pressure sensor 33 is calculated.

A determination whether the current combination of the fuel pressure amplitude ΔFUPR and the fuel pressure average value FUPRAV falls within the region in which the fuel vapor is generated or the region in which the fuel vapor is not generated, is made by referring to the first table which previously stores whether the correlation between the fuel pressure amplitude ΔFUPR and the fuel pressure average value FUPRAV at that time corresponds to the region in which the fuel vapor is generated or the region in which the fuel vapor is not generated.

The fuel pressure amplitude ΔFUPR can be calculated as a difference between the maximum value and the average value FUPRAV of the fuel pressure FUPR during the amplitude detection period, a difference between the average value FUPRAV and the minimum value, or a difference between the maximum value and the minimum value.

Not only the average value FUPRAV can be determined as a simple average value of the fuel pressures FUPR detected in the average value detection period, but also a value in which the output signal of fuel pressure sensor 33 is processed using a low-pass filter can be set to the average value FUPRAV.

In a transient state of the change in fuel pressure, the fuel pressure amplitude ΔFUPR and the average value FUPRAV is not able to be detected with high accuracy, and the detection accuracy of the fuel vapor generation is degraded. Therefore, preferably the detection of the fuel vapor generation based on the fuel pressure amplitude ΔFUPR and the average value FUPRAV or the correction of the target fuel pressure TGPR based on the detection of the fuel vapor generation is prohibited in the transient state.

As described above, the fuel pressure amplitude ΔFUPR increases when the fuel vapor is generated. On the other hand, the fuel pressure amplitude ΔFUPR generated in the state in which the fuel vapor is not generated increases with increasing fuel pressure.

The first table is set in Step S201 such that the boundary value BO1 that separates the region in which the fuel vapor is not generated from the region in which the fuel vapor is generated is shifted to the side of the greater amplitude ΔFUPR as the average value FUPRAV increases. The region in which the amplitude ΔFUPR is greater than the boundary value BO1 is the region in which the fuel vapor is generated, the region where the amplitude ΔFUPR is smaller than the boundary value BO1 is the region in which the fuel vapor is not generated, and the boundary value BO1 corresponds to the maximum value of the allowable fuel vapor quantity.

In the first table of FIG. 5, the boundary value BO1 that separates the region in which the fuel vapor is not generated from the region in which the fuel vapor is generated is set to the property in which the amplitude ΔFUPR linearly increases with increasing average value FUPRAV. The boundary value BO1 is not limited to the linear property.

In Step S202, it is determined whether the determination that the fuel pressure exists in the region in which the fuel vapor is generated is made based on the average value FUPRAV and the amplitude ΔFUPR at that time in Step S201.

When the determination that the fuel pressure exists in the region in which the fuel vapor is not generated, that is, when the actual amplitude ΔFUPR is smaller than the threshold of the amplitude that is set higher with increasing average value FUPRAV, the process proceeds to Step S204 to determine whether the flag F is set to "1".

Similarly to the flowchart of FIG. 2 of the first embodiment, the flag F is set to "1" when the determination that the fuel vapor is generated is made in Step S201. Then, the flag F is maintained at "1" until the determination that the fuel vapor is removed is made, and the flag F is reset to "0" at the time the determination that the fuel vapor is removed is made.

Accordingly, when the continuous fuel vapor is not generated, the flag F is set to "0", and the process proceeds to Step S208.

In Step S208, as the target fuel pressure TGPR, the target fuel pressure TGPR-STD that is set according to the engine operating conditions such as the engine load TP, the engine rotating speed NE, and the cooling water temperature TW is set to the final target fuel pressure TGPR, and the applied voltage of fuel pump 12 is calculated such that the actual fuel pressure FUPR is brought close to the target fuel pressure TGPR-STD.

On the other hand, when the determination that the current combination of the average value FUPRAV and the amplitude ΔFUPR corresponds to the region in which the fuel vapor is generated is made in Step S201, that is, when the actual amplitude ΔFUPR is higher than the amplitude threshold that increases with increasing average value FUPRAV, the fuel vapor is estimated to be generated in fuel supply piping 17, the process proceeds from Step S202 to Step S203.

In Step S203, the flag F is set to "1". Then the process proceeds to Step S209.

In Step S209, the target fuel pressure TGPR is corrected to be higher than the target fuel pressure TGPR-STD in order to compress and remove the fuel vapor generated in fuel supply piping 17.

In Step S209, the target fuel pressure TGPR is corrected similarly to Step S109.

As described above, the determination whether the fuel vapor is generated in fuel supply piping 17 is made base on the average value FUPRAV and the amplitude ΔFUPR. In the state in which the fuel vapor is generated, the fuel vapor can be compressed and removed in fuel supply piping 17 when the target fuel pressure TGPR is changed to a higher value. When the fuel vapor is removed, fuel injection valve 3 injects the fuel vapor along with the fuel, which allows the degradation of the measurement accuracy of the fuel to be suppressed to control the air-fuel ratio with high accuracy.

The fuel pressure amplitude ΔFUPR decreases, when the target fuel pressure TGPR is changed to the higher value to compress the fuel vapor in Step S209. As a result, in Step S201, the determination that the combination of the average value FUPRAV and the amplitude ΔFUPR corresponds to the region in which the fuel vapor is not generated is made.

In Step S202, when the determination that the combination of the average value FUPRAV and the amplitude ΔFUPR exists in the region in which the fuel vapor is not generated is made, the process proceeds to Step S204. The flag F is set to "1", and thus, the process proceeds to Step S204 from Step S205.

In Step S205, the second table, in which the boundary value BO2 between the region in which the fuel vapor is not generated and the region in which the fuel vapor is generated is shifted to the side of the amplitude ΔFUPR smaller than that of the boundary value BO1 in the first table used to determine whether the fuel vapor is generated in Step S201, is referred to determine whether the combination of the average value FUPRAV and the amplitude ΔFUPR at that time corresponds to the region in which the fuel vapor is generated or the region in which the fuel vapor is not generated.

The second table is used to determine whether the fuel vapor generation state is eliminated, that is, whether the fuel vapor quantity in fuel supply piping 17 sufficiently reduces.

In Step S206, it is determined whether the determination that the combination of the average value FUPRAV and the amplitude ΔFUPR corresponds to the fuel vapor generation region is made in Step S205. When the combination of the average value FUPRAV and the amplitude ΔFUPR corresponds to the fuel vapor generation region, a determination that the correction of the target fuel pressure TGPR is not able to be released is made although the amplitude ΔFUPR decreases by the removal of the fuel vapor, the process proceeds to Step S209, and the correction of the target fuel pressure TGPR is continued.

On the other hand, when the determination that the combination of the average value FUPRAV and the amplitude ΔFUPR corresponds to the region in which the fuel vapor is not generated is made in Step S205, a determination that the removal of the fuel vapor sufficiently progresses to be able to release the correction of the target fuel pressure TGPR is made. After the flag F is reset to "0" in Step S207, the process proceeds to Step S208, the correction of the target fuel pressure TGPR is released, and the target fuel pressure TGPR-STD corresponding to the operating conditions is directly set to the final target fuel pressure TGPR.

According to the embodiment, because the determination whether the fuel vapor is generated is made based on the detected result of fuel pressure sensor 33, it is not necessary to provide a new sensor to detect whether the fuel vapor is generated, and the system cost can be suppressed.

When the fuel vapor generation is detected, the target fuel pressure TGPR is changed to the higher value to compress the fuel vapor, so that the fuel vapor generated in fuel supply piping 17 can quickly be removed.

In the embodiment, the first table used to determine whether the fuel vapor is generated and the second table used to determine whether the removal of the fuel vapor is completed are provided, and thus, the repetition of the correction of the target fuel pressure TGPR and the release of the correction of the target fuel pressure TGPR can be suppressed to obtain the stable state in which the fuel vapor is not generated. Therefore, the good measurement accuracy of the fuel injection valve 3 can be maintained.

In the correction of the target fuel pressure TGPR, when the correction level can change according to the conditions, such as the fuel temperature, which affect the fuel vapor generation, the useless power consumption caused by correcting the target fuel pressure TGPR to an excessively high value during the fuel vapor generation can be suppressed.

In the routine of the flowchart of FIG. 5, for the sake of convenience, the determination threshold of the amplitude ΔFUPR is a fixed value, and the determination whether the fuel vapor is generated can be made based on whether the amplitude ΔFUPR is smaller than the fixed determination threshold.

The standard amplitude generated in the state in which the fuel vapor is not generated is determined based on the average value FUPRAV, and the determination whether the fuel vapor is generated can be made based on whether the result in which the standard amplitude is subtracted from the measured amplitude ΔFUPR is smaller than the fixed determination threshold.

The detection of the fuel vapor generation in fuel pump 12 in the flowchart of FIG. 2 and the detection of the fuel vapor generation in fuel supply piping 17 in the flowchart of FIG. 5 are concurrently performed, and the target fuel pressure TGPR can be corrected when the fuel vapor generation is detected in at least one of fuel pump 12 and fuel supply piping 17.

After the target fuel pressure TGPR is shifted to the high-pressure side based on the fuel vapor generation determination, the state in which the target fuel pressure TGPR is shifted to the high-pressure side is retained until a previously-set retaining time elapses, and the target fuel pressure TGPR can be returned to a usual value at the time the retaining time elapses. At this point, the retaining time may be set to a constant time or a time that can change according to at least one of the operating conditions, such as the fuel temperature, the engine temperature, the fuel property, and the pressure in fuel tank 11, which affect the fuel vapor generation quantity.

The entire contents of Japanese Patent Application No. 2010-064856, filed Mar. 19, 2010 are incorporated herein by reference.

While only select embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention, the invention as claimed in the appended claims and their equivalents.

What is claimed is:

1. A fuel supply control device for an internal combustion engine, which inputs an output signal of a fuel pressure sensor that detects a pressure of fuel discharged by a fuel pump and calculates a manipulated variable of the fuel pump such that the fuel pressure comes close to a target value to output the calculated the manipulated variable, comprising:
- a unit that calculates a state quantity of the fuel pressure based on the output signal; and
- a unit that compares the state quantity and a threshold to determine whether a fuel vapor is generated and outputs a signal indicating whether the fuel vapor is generated.

2. The fuel supply control device for an internal combustion engine according to claim 1, further comprising a unit that changes the target value to a higher pressure value when the fuel vapor is generated.

3. The fuel supply control device for an internal combustion engine according to claim 2, wherein the unit that changes the target value variably sets a change width of the target value based on at least one of a fuel temperature, an engine temperature, a fuel property, and a pressure of a fuel tank.

4. The fuel supply control device for an internal combustion engine according to claim 1, wherein the unit that calculates the state quantity calculates the fuel pressure as the state quantity, and
- the unit that determines whether the fuel vapor is generated determines that the fuel vapor is generated when the fuel pressure is lower than a first threshold.

5. The fuel supply control device for an internal combustion engine according to claim 4, further comprising a unit that changes the first threshold to a higher value as the manipulated variable changes in a direction in which the fuel pressure is increased.

6. The fuel supply control device for an internal combustion engine according to claim 1, wherein the unit that calculates the state quantity calculates an amplitude of the fuel pressure as the state quantity, and
- the unit that determines whether the fuel vapor is generated determines that the fuel vapor is generated when the amplitude of the fuel pressure is greater than a second threshold.

7. The fuel supply control device for an internal combustion engine according to claim 6, further comprising a unit that changes the second threshold to a higher value with increasing fuel pressure.

8. The fuel supply control device for an internal combustion engine according to claim 1, wherein the unit that calculates the fuel pressure and an amplitude of the fuel pressure as the state quantity,
- the unit that determines whether the fuel vapor is generated determines that the fuel vapor is generated when the fuel pressure is lower than a first threshold, and
- the unit that determines whether the fuel vapor is generated determines that the fuel vapor is generated when the amplitude of the fuel pressure is greater than a second threshold.

9. A fuel supply control device for an internal combustion engine, which inputs an output signal of a fuel pressure sensor that detects a pressure of fuel discharged by a fuel pump and calculates a manipulated variable of the fuel pump such that the fuel pressure comes close to a target value to output the manipulated variable, comprising:
- means for calculating a state quantity of the fuel pressure based on the output signal; and
- means for comparing the state quantity and a threshold to determine whether a fuel vapor is generated and outputting a signal indicating whether the fuel vapor is generated.

10. A fuel vapor processing method in a fuel supply control device for an internal combustion engine, which inputs an output signal of a fuel pressure sensor that detects a pressure of fuel discharged by a fuel pump and calculates a manipulated variable of the fuel pump such that the fuel pressure comes close to a target value to output the manipulated variable, the fuel vapor processing method comprising the steps of:
- calculating a state quantity of the fuel pressure based on the output signal; and
- comparing the state quantity and a threshold to determine whether a fuel vapor is generated.

11. The fuel vapor processing method in a fuel supply control device for an internal combustion engine according to claim 10, further comprising the step of changing the target value to a higher value when the fuel vapor is generated.

12. The fuel vapor processing method in a fuel supply control device for an internal combustion engine according to claim 11, wherein the step of changing the target value includes a step of setting variably a change width of the target value based on at least one of a fuel temperature, an engine temperature, a fuel property, and a pressure of a fuel tank.

13. The fuel vapor processing method in a fuel supply control device for an internal combustion engine according to claim 10, wherein the step of calculating the state quantity calculates the fuel pressure as the state quantity, and
- the step of determining whether the fuel vapor is generated determines that the fuel vapor is generated when the fuel pressure is lower than a first threshold.

14. The fuel vapor processing method in a fuel supply control device for an internal combustion engine according to claim 13, further comprising the step of changing the first threshold to a higher value as the manipulated variable changes in a direction in which the fuel pressure is increased.

15. The fuel vapor processing method in a fuel supply control device for an internal combustion engine according to claim 10, wherein the step of calculating the state quantity calculates an amplitude of the fuel pressure as the state quantity, and the step of determining whether the fuel vapor is generated determines that the fuel vapor is generated when the amplitude of the fuel pressure is greater than a second threshold.

16. The fuel vapor processing method in a fuel supply control device for an internal combustion engine according to claim 15, further comprising the step of changing the second threshold to a higher value with increasing fuel pressure.

17. The fuel vapor processing method in a fuel supply control device for an internal combustion engine according to claim 10, wherein the step of calculating the fuel pressure and an amplitude of the fuel pressure as the state quantity, the step of determining whether the fuel vapor is generated determines that the fuel vapor is generated when the fuel pressure is lower than a first threshold, and the step of determining whether the fuel vapor is generated determines that the fuel vapor is generated when the amplitude of the fuel pressure is greater than a second threshold.

* * * * *